(12) United States Patent
Shimotsu et al.

(10) Patent No.: US 8,500,340 B2
(45) Date of Patent: Aug. 6, 2013

(54) OPTICAL FERRULE ASSEMBLY

(75) Inventors: Akihiro Shimotsu, Ebina (JP); Kentaro Imai, Kanagawa (JP)

(73) Assignee: Molex Incorporated, Lisle, IL (US)

( * ) Notice: Subject to any disclaimer, the term of this patent is extended or adjusted under 35 U.S.C. 154(b) by 608 days.

(21) Appl. No.: 12/306,160

(22) PCT Filed: Jun. 1, 2007

(86) PCT No.: PCT/IB2007/004697
§ 371 (c)(1),
(2), (4) Date: Sep. 7, 2010

(87) PCT Pub. No.: WO2009/030982
PCT Pub. Date: Mar. 12, 2009

(65) Prior Publication Data
US 2010/0322564 A1    Dec. 23, 2010

(30) Foreign Application Priority Data

Jun. 20, 2006  (JP) ................................ 2006-169691

(51) Int. Cl.
*G02B 6/38* (2006.01)
*G02B 6/255* (2006.01)

(52) U.S. Cl.
USPC .................. 385/60; 385/62; 385/98

(58) Field of Classification Search
USPC ................................. 385/60, 62, 98
See application file for complete search history.

(56) References Cited

U.S. PATENT DOCUMENTS

2006/0002662 A1 *  1/2006  Manning et al. ................ 385/78

* cited by examiner

*Primary Examiner* — Omar Rojas
(74) *Attorney, Agent, or Firm* — Timothy M. Morella

(57) ABSTRACT

An optical ferrule assembly is disclosed. The optical ferrule assembly comprises a ferrule body, a notch part, a retainer and an annular member. The ferrule body includes an optical fiber loading hole extending therethough in a longitudinal direction. The notch part is formed in the ferrule body and has a flat surface which receives the optical fiber loading hole. The retainer is arranged in the notch part and has a lower abutting surface opposing to the flat surface and an inclined abutting surface formed on one end side of the lower abutting surface. The annular member fits on an outer periphery of the ferrule body. When the annular member is brought into contact with a portion of an outer peripheral surface of the retainer on one end side thereof, the inclined abutting surface is opposed to the flat surface, and the lower abutting surface is inclined to the flat surface and separated from the flat surface. When the annular member is brought into contact with the whole of the outer peripheral surface of the retainer, the inclined abutting surface is inclined to the flat surface and separated from the flat surface, and the lower abutting surface is opposed to the flat surface.

12 Claims, 18 Drawing Sheets

OPTICAL FERRULE ASSEMBLY

BACKGROUND OF THE INVENTION

1. Field of the Invention

The Present Invention relates generally to an optical ferrule assembly.

2. Description of the Related Art

Conventionally, in optical connectors used in optical communications and the like, it has been proposed to use an optical ferrule assembly having a mechanical splice structure therein, in order that an optical fiber can be easily connected for a short time at the laying site or the like (refer to, for example, Japanese Patent Applications Laid-Open (Kokai) Nos. 2005-114860 and 2005-241956).

FIG. 18 is a cross sectional view showing the structure of a conventional optical ferrule assembly. In FIG. 18, reference numeral 301 denotes a ferrule body in the optical ferrule assembly, and a mid-portion thereof is semi-cylindrically cut out to form a notch part 302. Also, a cylindrical guide part 303 is formed at the rear part of the ferrule body 301, and a ring-shaped flange part 304 is fixed to the outer periphery of the ferrule body 301. An optical fiber loading hole 306 extending from the front end surface to the inside is formed centrally of the ferrule body 301, and an optical fiber core cable 307 is fixed by adhesive in the optical fiber loading hole 306. The notch part 302 is provided with a first optical fiber inserting groove 308 of semicircular cross section aligned with the optical fiber loading hole 306. The guide part 303 is provided with an optical fiber inserting hole 309 of semicircular cross section aligned with respect to the first optical fiber inserting groove 308.

A semi-cylindrical retainer 310 is placed in the notch part 302. The lower surface of the retainer 310 is provided with a second optical fiber inserting groove 311 of V-like cross section. The second optical fiber inserting groove 311 cooperates with the first optical fiber inserting groove 308 to construct an optical fiber inserting path. A ring member 312 is slidably fitted on the outer periphery of the guide part 303. The ferrule body 301 has an inlet for refractive index matching agent 317. A refractive index matching agent 318 impregnated from the inlet for index matching agent 317 is adhered in advance on the rear end of the optical fiber core cable 307 in the optical fiber inserting path.

When inserting another optical fiber core cable into the above-mentioned optical ferrule assembly, the optical fiber core cable is inserted from the rear end surface of the ferrule body 301 into the optical fiber inserting hole 309. In this case, some clearance is left between the upper surface of the notch part 302 and the lower surface of the retainer 310. Therefore, the cross section of the optical fiber inserting path to be formed between the first optical fiber inserting groove 308 and the second optical fiber inserting groove 311 is sufficiently large with respect to the optical fiber core cable. It is therefore possible to smoothly insert another optical fiber core cable from the optical fiber inserting hole 309 into the optical fiber inserting path, thereby bringing the tip thereof into contact with the rear end of the optical fiber core cable 307.

Subsequently, when the ring member 312 is advanced, the lower surface of the retainer 310 can be pressed against the upper surface of the notch part 302 by means of the ring member 312. As the result, the other optical fiber core cable is held between the first optical fiber inserting groove 308 and the second optical fiber inserting groove 311, and fixed to the ferrule body 301. The rear end of the upper surface of the retainer 310 is provided with a taper portion 316, enabling the ring member 312 to smoothly be advanced to a position on the ring member 312.

However, in the above-mentioned conventional optical ferrule assembly, smooth insertion of the optical fiber core cable requires that the clearance be left between the upper surface of the notch part 302 and the lower surface of the retainer 310. To this end, a resilient member such as resin is interposed between the upper surface of the notch part 302 and the lower surface of the retainer 310, or a resilient projection is provided on the lower surface of the retainer 310 formed of a resilient member such as resin. This may increase the number of parts of the optical ferrule assembly and complicate the construction of the retainer 310.

SUMMARY OF THE INVENTION

In view of the foregoing problem encountered by the conventional optical ferrule assembly, it is an object of the present invention to provide an optical ferrule assembly that can achieve a simple structure without increasing the number of parts, and enables an optical fiber core cable to be smoothly inserted and connected, and permits an easy manufacturing in simple manufacturing steps, by forming an inclined abutting surface at one end of a lower abutting surface of a retainer arranged in a notch part formed in a ferrule body, so that the inclined abutting surface is opposed to the flat surface of the notch part, and the lower abutting surface is inclined to the flat surface and separated from the flat surface, when an annular member fitted on the outer periphery of the ferrule body is brought into contact with a portion of the retainer on one end side thereof.

Therefore, an optical ferrule assembly, according to the present invention, comprises a ferrule body having an optical fiber loading hole extending therethrough in a longitudinal direction, a notch part formed in the ferrule body and having a flat surface including the optical fiber loading hole, a retainer arranged in the notch part and having a lower abutting surface opposing to the flat surface, and an inclined abutting surface formed on one end side of the lower abutting surface, and an annular member fitted on an outer periphery of the ferrule body, wherein the inclined abutting surface is opposed to the flat surface, and the lower abutting surface is inclined to the flat surface and separated from the flat surface, when the annular member is brought into contact with a portion of the outer peripheral surface of the retainer on one end side thereof, and, the inclined abutting surface is inclined to the flat surface and separated from the flat surface, and the lower abutting surface is opposed to the flat surface, when the annular member is brought into contact with the whole of the outer peripheral surface of the retainer.

In the optical ferrule assembly, according to a further embodiment of the present invention, the optical fiber loading hole accommodates a first optical fiber inserted in advance from one end side of the ferrule body, the first optical fiber extends from one end side of the retainer into the notch part, and the end surface of the first optical fiber is positioned at a position of the optical fiber loading hole corresponding to the lower abutting surface within, a second optical fiber inserted from the other end side of the ferrule body is inserted from the other end side of the retainer into the notch part, and the end surface of the second optical fiber is brought into abutment against the end surface of the first optical fiber, when the annular member is brought into contact with an outer peripheral surface of one end side of the retainer, and the second optical fiber is pressed and fixed by the lower abutting surface, when the annular member is brought into contact with the whole of the outer peripheral surface of the retainer.

In the optical ferrule assembly, according to a further embodiment of the present invention, the annular member includes a first annular member and a second annular member, the inclined abutting surface is opposed to the flat surface, and the lower abutting surface is inclined to the flat surface and separated from the flat surface, when the first annular member is not brought into contact with the outer peripheral surface of the retainer and the second annular member is brought into contact with the outer peripheral surface of the retainer on one end side thereof, and the inclined abutting surface is inclined to the flat surface and separated from the flat surface, and the lower abutting surface is opposed to the flat surface, when the first annular member is brought into contact with the outer peripheral surface of the retainer.

In the optical ferrule assembly, according to a further embodiment of the present invention, the fastening force of the first annular member is set larger than the fastening force of the second annular member.

In the optical ferrule assembly, according to a further embodiment of the present invention, the retainer has a groove formed in the inclined abutting surface, and the groove is opposed to the optical fiber loading hole, when the inclined abutting surface is opposed to the flat surface.

In accordance with the present invention, the optical ferrule assembly has the inclined abutting surface formed at one end of the lower abutting surface of the retainer arranged in the notch part formed in the ferrule body, so that the inclined abutting surface is opposed to the flat surface of the notch part, and the lower abutting surface is inclined to the flat surface and separated from the flat surface, when the annular member fitted on the outer periphery of the ferrule body is brought into contact with the portion of the retainer on one end side thereof. This enables the lower surface of the retainer adjacent to the other end of the retainer to be separated from the upper surface of the notch part, and consequently, without increasing the number of parts, the structure can be simplified, and optical fiber core cables can be smoothly inserted and connected. This achieves an easy manufacturing in simple manufacturing steps.

DETAILED DESCRIPTION OF THE PREFERRED EMBODIMENTS

Figure 1:
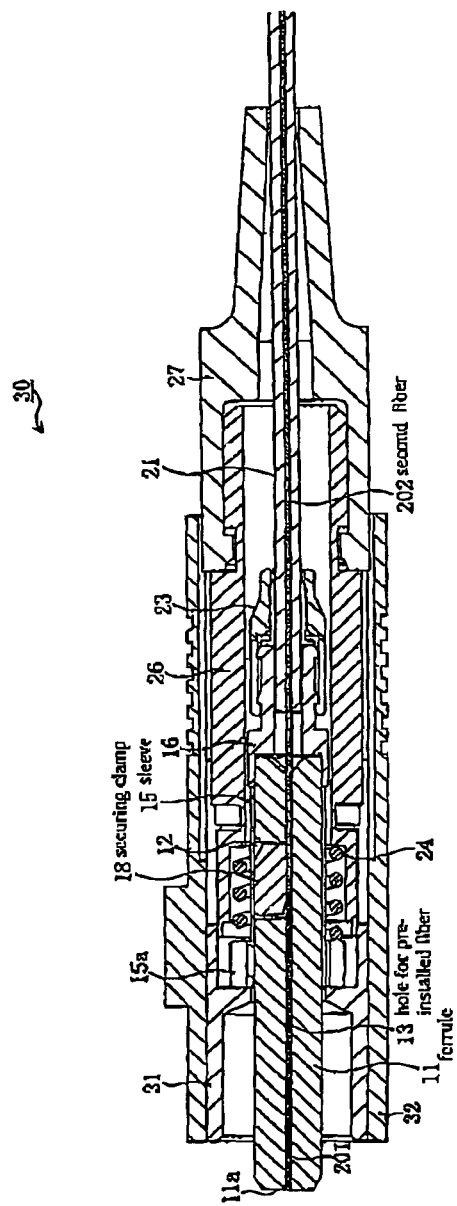
FIG. 1 is a cross-sectional view of an optical connector, according to one embodiment of the Present Invention.

Preferred embodiments are described in detail below with reference to the accompanying drawings in which like reference numerals designate corresponding components throughout the several views.

Referring to the Figures, optical ferrule assembly 10 is fixed to the termination of an optical transmission path in optical connector 30. For purposes of the Present Invention, a linear body having a bare (e.g., non-coated) fiber as an optical transmission path, and a protective coating layer covering the bare fiber, is an "optical fiber core cable." Further, a linear body in which the protective coating layer is removed from the optical fiber core cable (e.g., a bare fiber or a fiber corresponding to a bare fiber) is an "optical fiber."

Further, representations of directions such as up, down, left, right, front, rear and the like, used for explaining the structure and movement of each part of optical connector 30 and optical ferrule assembly 10, are not absolute, but relative. These representations are appropriate when each part of optical connector 30 and optical ferrule assembly 10 is situated in the position shown in the Figures. If the position of a part of optical connector 30 and optical ferrule assembly 10 changes, it is assumed that these representations are to be changed according to the change of the position of each part.

Figure 2:
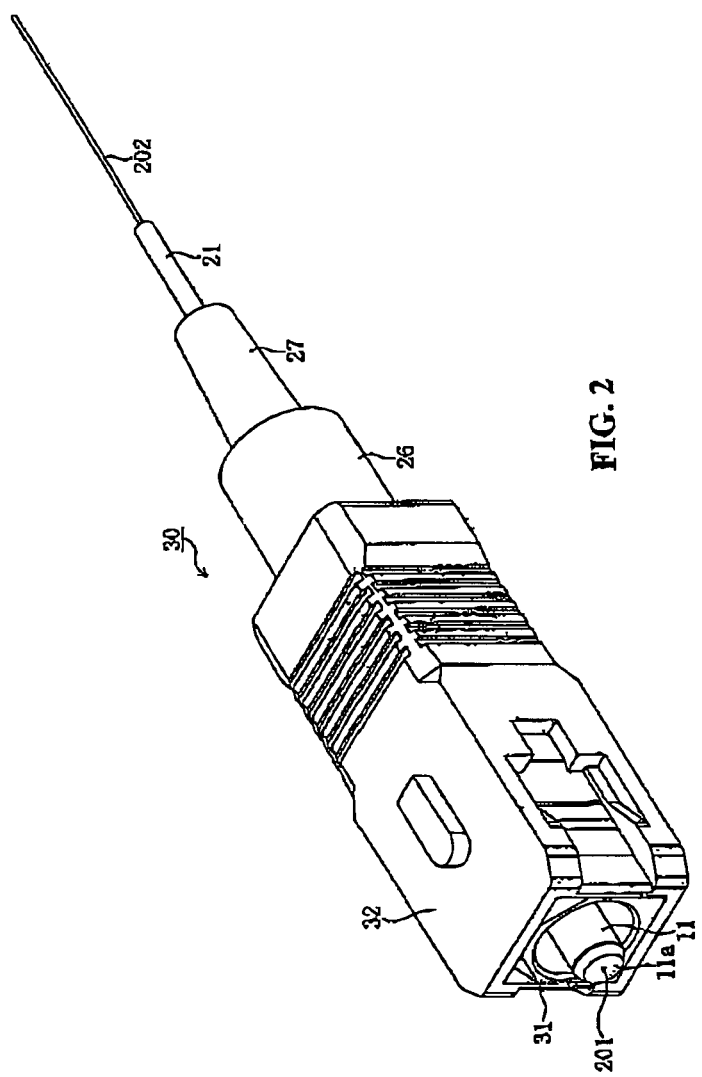
FIG. 2 is a perspective view of the optical connector of FIG. 1.
Figure 3:
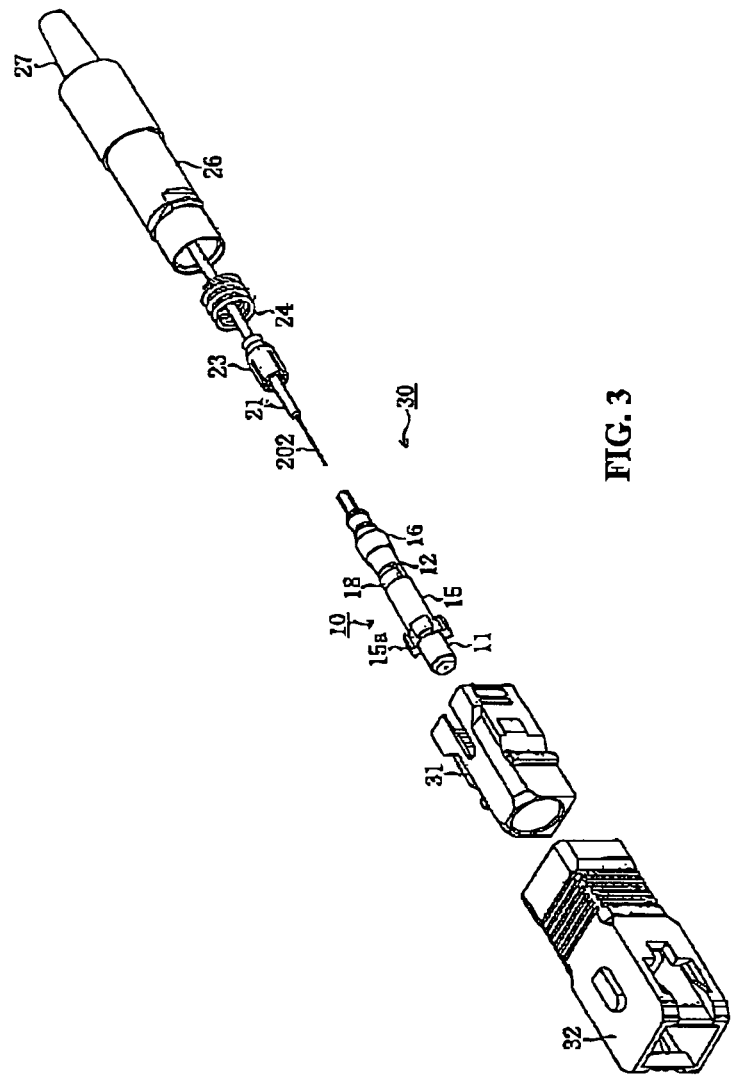
FIG. 3 is an exploded view of the optical connector of FIG. 1.

Referring to the Figures, generally, and more particularly to FIGS. 1-3, optical ferrule assembly 10 is illustrated as having cylindrical ferrule body 11, cylindrical sleeve member 15 (as an annular member fitted on the outer periphery of ferrule body 11) and core cable fixing member 16 fitted on a rear end of ferrule body 11. Sleeve member 15 has flange part 15a integrally formed therewith at a front end.

Optical fiber loading hole 13, preferably of circular cross-section, is formed centrally of ferrule body 11 so as to extend therethrough in a longitudinal direction. First optical fiber 201 and second optical fiber 202 are inserted into optical fiber loading hole 13, preferably from opposing ends of optical fiber loading hole 13. For purposes of the Present Invention, when first and second optical fibers 201, 202 are described collectively, the two fibers will hereinafter be described as optical fiber 20. Additionally, notch part 12, preferably of semi-circular cross-section, is formed midway along ferrule body 11. The cross-section of ferrule body 11 at the position of notch part 12 is of a semi-circle. The surface of notch part 12 disposed closest to the center of ferrule body 11 comprises a flat surface passing through the center of ferrule body 11, and further includes a groove passing through the center thereof, preferably of a semi-circular cross section. That is, the flat surface of notch part 12 includes optical fiber loading hole 13.

Preferably, the inner diameter of optical fiber loading hole 13 is larger than the outer diameter of optical fiber 20. Although optical fiber 20 may be of varying radii, for purposes of the Present Invention, it is assumed that it has at least the same outer diameter.

Preferably, first optical fiber 201 is inserted in advance into the front side portion of optical fiber loading hole 13, and fixed therein by an adhesive. The front end surface of first optical fiber 201 is flush with front end surface 11a of ferrule body 11, and the rear end surface thereof is situated within notch part 12.

Further, second optical fiber 202 (e.g., the optical fiber in which the protective coating layer is removed from optical fiber core cable 21 in a predetermined range of length from the tip thereof, as shown in FIG. 3) is inserted from the rear end of ferrule body 11 into optical fiber loading hole 13, so that the front end surface of second optical fiber 202 is in abutment against the rear end surface of first optical fiber 201 within notch part 12. Second optical fiber 202 is fixed to ferrule body 11 by being pressed from above by retainer 18 loaded in notch part 12.

Further, sleeve member 23 is fitted on the outer periphery of optical fiber core cable 21. When inserting second optical fiber 202 from the rear end side of ferrule body 11 into optical fiber loading hole 13, sleeve member 23 engages with core cable fixing member 16, fitted on the rear end of ferrule body 11, enabling optical fiber core able 21 to be fixed to ferrule body 11.

Thus, ferrule body 11, now having optical fiber core cable 21 and second optical fiber 202 attached, can be assembled into optical connector 30 as an optical connector assembly, by inserting part of ferrule body 11, which is situated in front of flange part 15a of cylindrical sleeve member 15, into the internal space of connector housing 31, and then pressing flange part 15a against an internal projection of connector housing 31 from the rear by spring 24 as a resilient member. That is, flange part 15a is disposed between and resiliently held from the rear and the front by the internal projection of connector housing 31 and spring 24. Spring 24 is supported from the rear by retainer 26 attached to the rear end of connector housing 31.

Strain release boot 27 extending backward is attached to retainer 26. Strain release boot 27 is a hollow member covering optical fiber core cable 21, and protects optical fiber core cable 21 from bending stress and the like. Further, outer casing 32 is arranged on the outer peripheries of connector housing 31, retainer 26 and a portion of strain release boot 27. The external surface of outer casing 32 has protrusions and recesses used in alignment and the like for connection with a counterpart connector.

Figure 4:
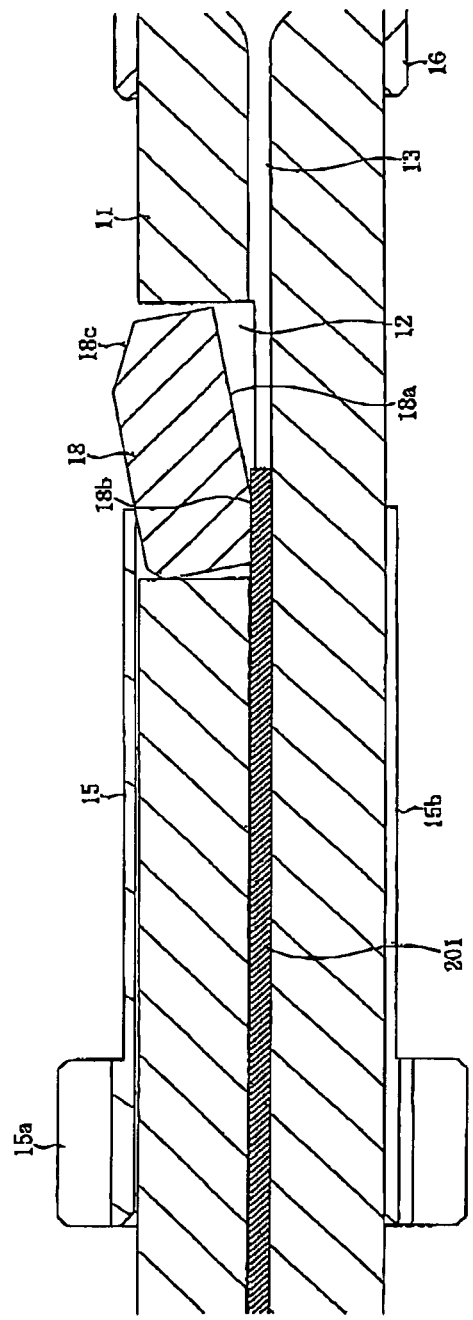
FIG. 4 is a cross-sectional view of the optical ferrule assembly of the optical connector of FIG. 1.
Figure 5:
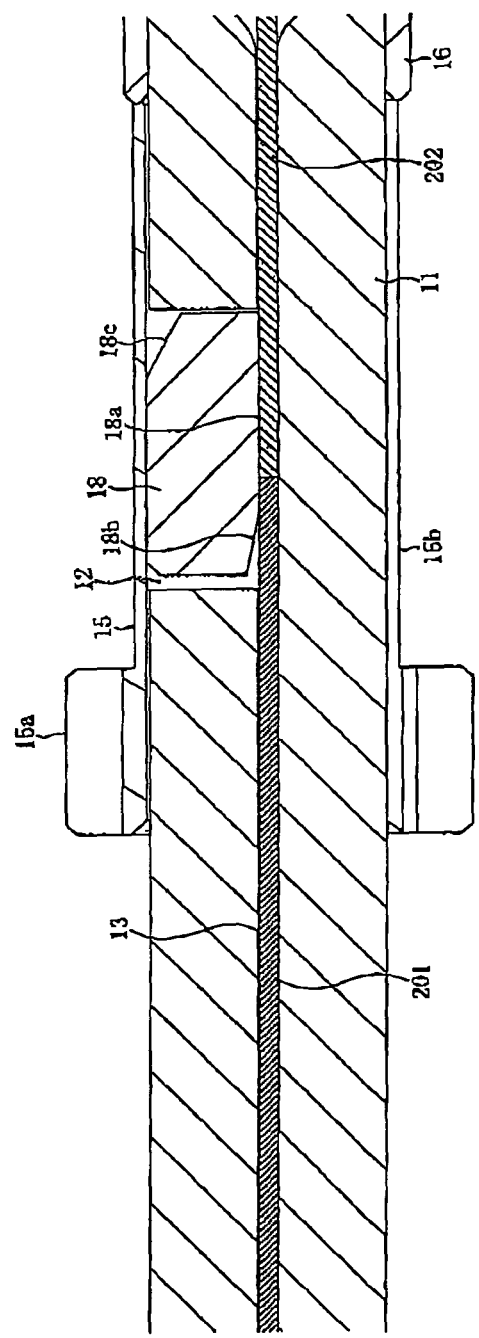
FIG. 5 is a further cross-sectional view of the optical ferrule assembly of the optical connector of FIG. 1.
Figure 6:
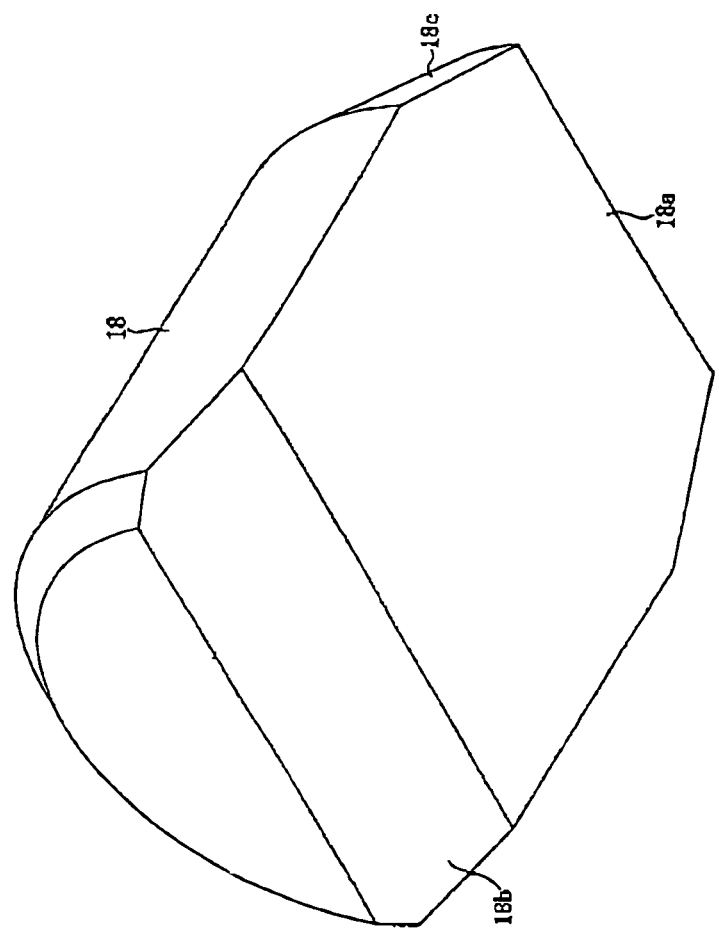
FIG. 6 is a perspective view of the retainer of the optical connector of FIG. 1.
Figure 7:
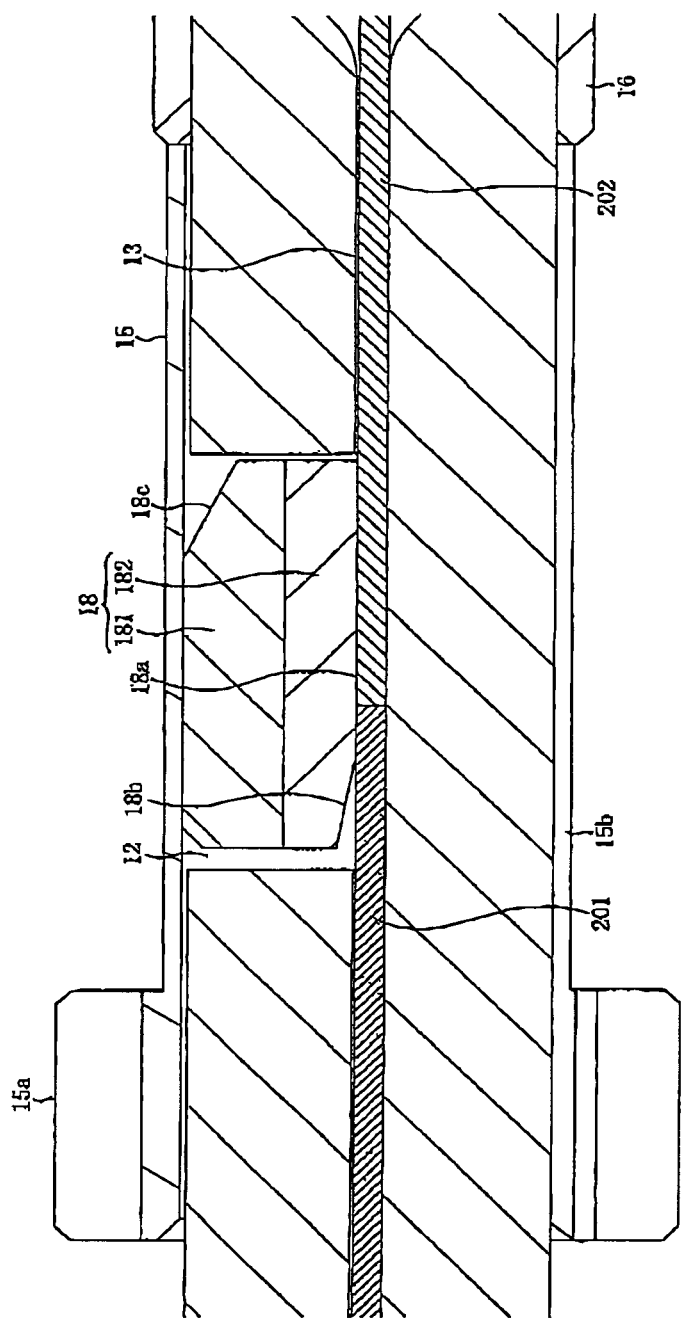
FIG. 7 is a cross-sectional view of the optical ferrule assembly of the optical connector of FIG. 1, using another retainer.

The following describes the structure for connecting first optical fiber 201 to second optical fiber 202. FIGS. 4-5 illustrate cross-sectional views of optical ferrule assembly 10. FIG. 6 is a perspective view of 18. FIG. 7 is a cross-sectional view of optical ferrule assembly 10 using another retainer. As described above, first optical fiber 201 is inserted in advance into the front side portion of optical fiber loading hole 13, and fixed therein by adhesive or the like. The rear end surface of first optical fiber 201 is situated within notch part 12, as shown in FIG. 4. Retainer 18 is placed in notch part 12, and the front end of sleeve member 15 is engaged with a portion of the upper surface of retainer 18.

As illustrated in FIG. 6, retainer 18 has a substantially semi-cylindrical form. Lower surface 18a of retainer 18 is a flat surface functioning as a pressing surface that presses the optical fiber 20, and is opposed to the upper surface of notch part 12. First inclined surface 18b, an inclined surface facing upward from notch part 12, is formed at the front end of lower surface 18a. As required, a curved or tapered surface can be formed at the boundary between lower surface 18a and first inclined surface 18b, thereby enabling lower surface 18a and first inclined surface 18b to be continued more smoothly.

The outer peripheral surface of retainer 18 is preferably of a semi-cylindrical form, whereas the rear end thereof is provided with second inclined surface 18c of a conical surface form. Second inclined surface 18c is a surface inclined downward when viewed from the side, and its angle, its dimension and the like can be set arbitrarily. Further, as required, a tapered surface can be formed at the front end of the outer peripheral surface of retainer 18. It is preferred that retainer 18 may be formed of any type of currently known plastic material, with some degree of elasticity.

Before second optical fiber 202 is inserted into optical fiber loading hole 13, sleeve member 15 is moved toward the front end of ferrule body 11, so that the rear end thereof covers the space above the vicinity of the front end of notch part 12, as shown in FIG. 4.

Sleeve member 15, like retainer 18 is also formed of any type of currently known plastic material with some degree of elasticity, has slit 15b cut in the cylindrical sidewall and extending in the longitudinal direction. Sleeve member 15 is preferably fitted on the outer periphery of ferrule body 11 with its diameter slightly enlarged. That is, sleeve member 15 is mounted on ferrule body 11 in a loose press-fit state. This enables sleeve member 15 to move relative to ferrule body 11 in the longitudinal direction. It is desirable that the force by which sleeve member 15 fastens ferrule body 11 be set to such a degree that the sleeve member 15 can be shifted the length of ferrule body 11. This force can be controlled by adjusting the inner diameter, the wall thickness and the like of sleeve member 15 in its free state. Also, as sleeve member 15 is preferably of an elastic material, slit 15b may be omitted.

Referring to FIGS. 4-5, the height dimension of retainer 18, namely, the dimension from the lower surface 18a to the uppermost part of the outer peripheral surface, is preferably slightly larger than the dimension from the upper surfaces of optical fiber 20 to the uppermost part of the outer peripheral surface of ferrule body 11. In other words, when retainer 18 is arranged in notch part 12 so that lower surface 18a rests on the upper surfaces of optical fiber 20, the uppermost part of the outer peripheral surface of retainer 18 slightly projects from the uppermost part of the outer peripheral surface of ferrule body 11 at positions in front of and behind notch part 12.

Consequently, if arranged so that the rear end (and surrounding region) of sleeve member 15 cover the space above the front end (and surrounding portion) of notch part 12, the uppermost part of the outer peripheral surface of retainer 18 contacts the inner surface of sleeve member 15, and the front end (and surrounding region) of retainer 18 is pressed down from above by sleeve member 15. Then, because first inclined surface 18b is formed at the front end of lower surface 18a of retainer 18, the front end of retainer 18 is lowered and the rear end thereof is raised. Thus, retainer 18 is inclined as a whole, as shown in FIG. 4. That is, when sleeve member 15 is brought into contact with the outer peripheral surface of the front end part of retainer 18, first inclined surface 18b is opposed to the flat surface of notch part 12, and lower surface 18a is inclined to, and separated from, the flat surface.

Thus, first inclined surface 18b becomes horizontal and is opposed to the upper surface of first optical fiber 201, and lower surface 18a is inclined upward, leaving a space between it and the upper surface of notch part 12. In the longitudinal direction, the range of lower surface 18a is greater than that of first inclined surface 18b, and the space occurs over the wide range from the rear end of notch part 12, due to the rise of lower surface 18a. The dimension from the front to the rear of first inclined surface 18b is set so that the rear end surface of first optical fiber 201 is situated below lower surface 18a, as shown in FIG. 4.

The operator then inserts second optical fiber 202 from the rear end side of ferrule body 11 into optical fiber loading hole 13, in the state in which sleeve member 15 is moved toward the front end of ferrule body 11 and retainer 18 is inclined. Since the space is left over the wide range from the rear end of notch part 12 due to the rise of lower surface 18a, the tip of second optical fiber 202 can be advanced smoothly into notch part 12. Second optical fiber 202 is then advanced to bring the front end surface thereof into abutment against the rear end surface of first optical fiber 201 within notch part 12.

Sleeve member 15 is then slid and shifted rearward so as to bring the rear edge of sleeve member 15 into abutment against the front edge of core cable fixing member 16 fitted in the rear end of ferrule body 11, as shown in FIG. 5. Thus, sleeve member 15 covers the entire space above notch part 12, and the whole of the outer peripheral surface of retainer 18 contacts the internal surface of sleeve member 15, and retainer 18 is entirely pressed down from above by sleeve member 15. Therefore, lower surface 18a is lowered, becomes horizontal and is opposed to the upper surface of optical fiber 20. That is, when sleeve member 15 is brought into contact with the whole of the outer peripheral surface of retainer 18, first inclined surface 18b is inclined to the flat surface of notch part 12 and separated from the flat surface, and lower surface 18a is opposed to the flat surface.

Retainer 18 is urged down under the force by which sleeve member 15 fastens ferrule body 11 because the dimension from lower surface 18a of retainer 18 to the uppermost part of the outer peripheral surface is slightly larger than the dimension from the upper surfaces of optical fiber 20 to the uppermost part of the outer peripheral surface of ferrule body 11. Hence, lower surface 18a of retainer 18 presses the upper surface of optical fiber 20, and presses them against the bottom surface of optical fiber loading hole 13 within notch part 12. Thus, second optical fiber 202 is fixed in optical fiber loading hole 13 in notch part 12, while maintaining the state in which the tip surface thereof is in abutment against the rear end surface of first optical fiber 201. As required, a reflective index matching agent can be applied to the site where the tip surface of second optical fiber 202 and the rear end surface of first optical fiber 201 abut against each other.

As described above, the force by which sleeve member 15 fastens ferrule body 11 can be controlled by adjusting the inner diameter, the wall thickness and the like of sleeve member 15. It is therefore desirable to set the above-mentioned force to the degree that second optical fiber 202 can be reliably fixed.

Retainer 18 is not necessarily required to be a single member, and it may be composed of a plurality of members. For example, as shown in FIG. 7, retainer 18 may be made from the combination of first upper retainer member 181 and second lower retainer member 182. In this case, first and second retainer members 181 and 182 may be bonded to each other for integration by adhesive or the like, or may remain so that they can be separated from each other, without being bonded to each other.

Thus, second optical fiber 202 can be connected to first optical fiber 201. Therefore, even at the laying site or the like, no special tool is needed except that the protective coating layer of optical fiber core cable 21 is removed with a tool. Thereafter, it is merely required to insert second optical fiber 202 from the rear end side of ferrule body 11 into optical fiber loading hole 13, and slide sleeve member 15 toward the rear. Subsequently, as described above, optical connector 30 can be assembled by inserting ferrule body 11 into the internal space of connector housing 31, and attaching retainer 26, strain release boot 27, the outer casing 32 and any other structural elements. Hence, without using any special tool, and by simple operation, second optical fiber 202 can be easily and surely connected to first optical fiber 201, thereby to assemble optical connector 30.

Figure 8:
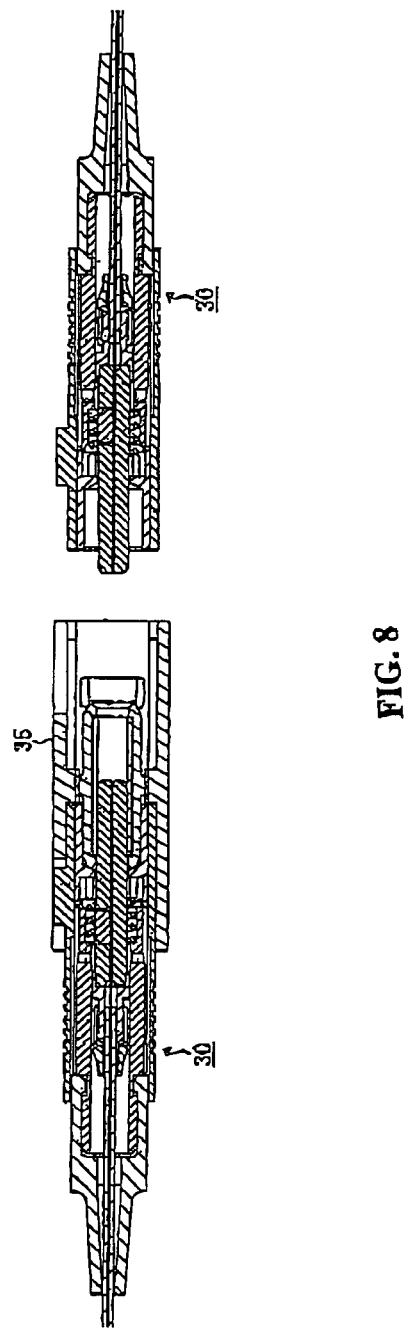
FIG. 8 is a cross-sectional view of optical connectors to be connected to each other in the optical connector of FIG. 1.
Figure 9:
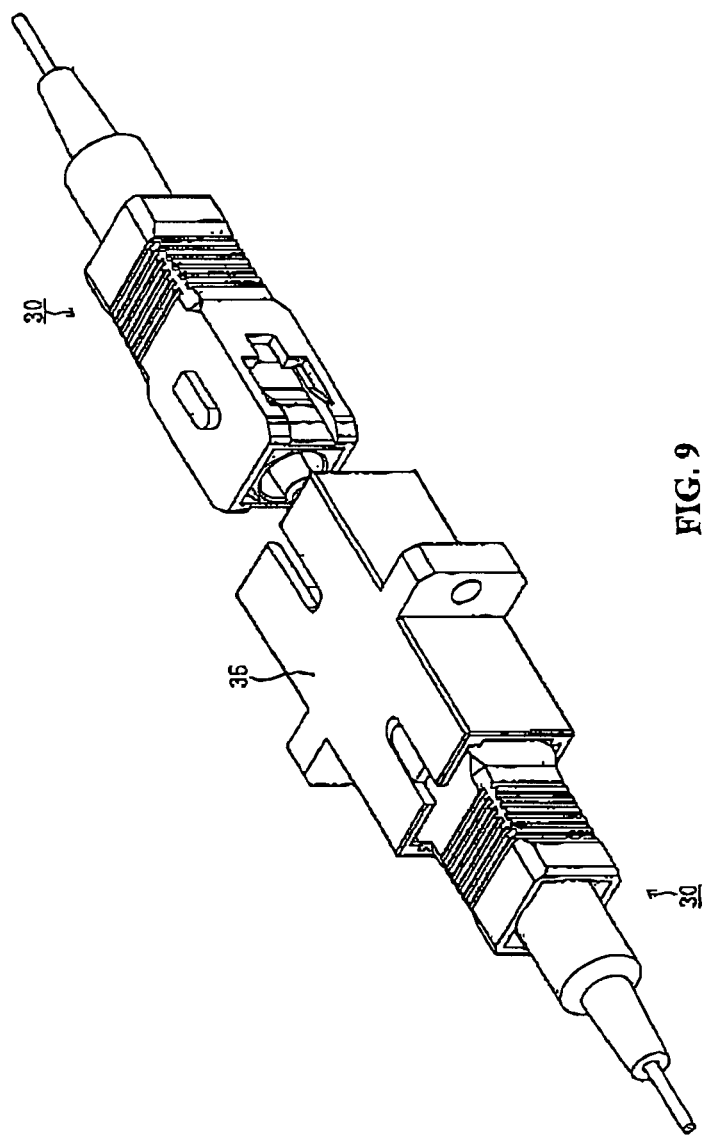
FIG. 9 is a perspective view of the optical connectors to be connected to each other in the optical connector of FIG. 1.

The following describes the operation of connecting a pair of counterpart optical connectors to each other. FIG. 8 illustrates a cross-sectional view of optical connectors connected to each other, while FIG. 9 is a perspective view thereof. Referring to FIGS. 8-9, connecting adaptor 35 is attached to an optical connector 30. Optical connector 30 can be connected to another optical connector 30 (of the same or varying type) via connecting adaptor 35 by engaging first optical connector 30 to the other side of connecting adaptor 35. Thus, both front end surfaces 11a of both ferrule bodies 11 of both optical connectors 30 are brought into abutment against each other. Further, both front end surfaces of both first optical fibers 201 are brought into abutment against each other so that the central axes of both first optical fibers 201 are coaxial to each other. This enables the light transmitted through one set of optical fibers 20 to be transmitted to the other set of optical fibers 20.

Thus, optical ferrule assembly 10 has ferrule body 11 having notch part 12 cut out in the shape of a semi-cylinder. Further, second optical fiber 202 is fixed by bringing optical fiber 20 into abutment against each other in notch part 12 and pressing second optical fiber 202 against the bottom surface of optical fiber loading hole 13 in notch part 12 by retainer 18. Thus, first inclined surface 18b is formed at the front end of lower surface 18a, and when second optical fiber 202 is inserted into optical fiber loading hole 13, sleeve member 15 presses the outer peripheral surface in the vicinity of the front end of retainer 18, in order to incline retainer 18 so that the rear end thereof is raised. First inclined surface 18b then becomes horizontal and opposed to the upper surface of first optical fiber 201, and lower surface 18a is inclined upward, leaving the space between lower surface 18a and the upper surface of notch part 12. Hence, second optical fiber 202 can be advanced smoothly into notch part 12, and the front end surface of second optical fiber 202 can be brought into abutment against the rear end surface of first optical fiber 201 within notch part 12.

Further, when front end surface of second optical fiber 202 is in abutment against the rear end surface of first optical fiber 201 in notch part 12, sleeve member 15 is slid and moved rearward, so that retainer 18 is entirely pressed. As the result, lower surface 18a of retainer 18 presses the upper surface of second optical fiber 202 to thereby press the latter against the bottom surface of optical fiber loading hole 13 in notch part 12. This enables second optical fiber 202 to be fixed in optical fiber loading hole 13 within the notch part 12. Accordingly, second optical fiber 202 can be easily and reliably connected to first optical fiber 201 fixed to ferrule body 11, thereby to assemble optical ferrule assembly 10.

Figure 10:
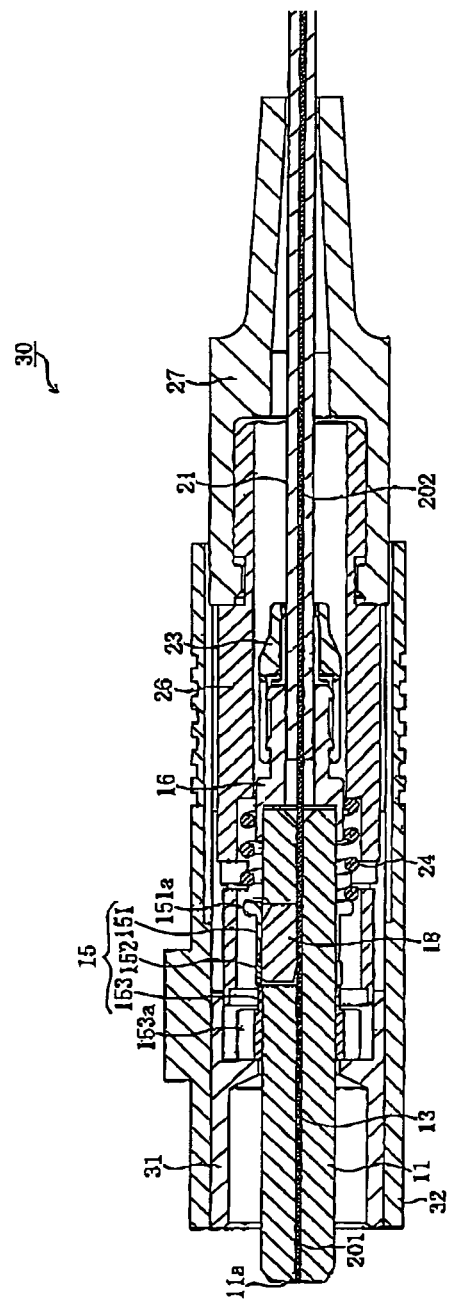
FIG. 10 is a cross-sectional view of an optical connector, according to a further embodiment of the Present Invention.
Figure 11:
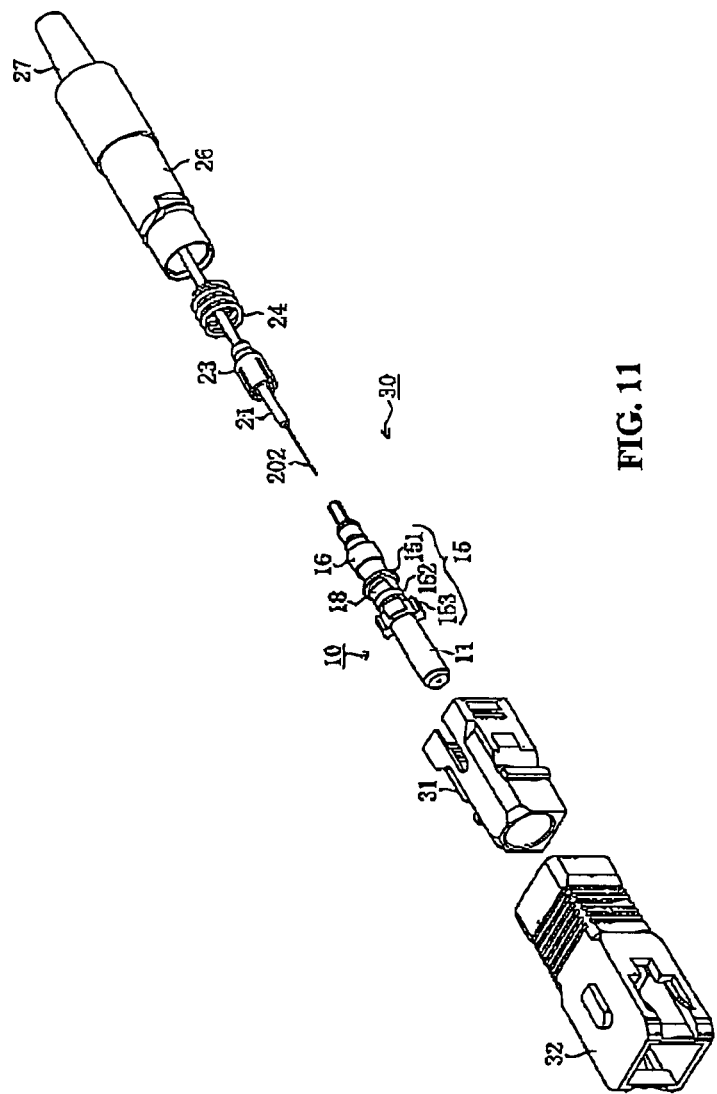
FIG. 11 is an exploded view of the optical connector of FIG. 10.

Referring to a further embodiment, FIG. 10 illustrates a cross-sectional view of an optical connector, while FIG. 11 is an exploded view of the optical connector. Referring to FIGS. 10-1, cylindrical sleeve member 15, as an annular member fitted on the outer periphery of ferrule body 11, is composed of first sleeve member 151, second sleeve member 152 and third sleeve member 153. First sleeve member 151 has an integrally formed flange part 151a at the rear end thereof, and third sleeve member 153 has an integrally formed flange part 153a at the rear end thereof.

Ferrule body 11, with optical fiber core cable 21 and second optical fiber 202 attached thereto, can be assembled into optical connector 30 by inserting part of ferrule body 11, which is situated in front of flange part 153a of third sleeve member 153, into the internal space of connector housing 31 and then pressing flange part 151a of first sleeve member 151 against the internal projection of connector housing 31 from the rear by spring 24 as a resilient member. That is, the flange part of sleeve member 15 is resiliently held from the rear and the front by the internal projection of connector housing 31 and spring 24.

Figure 12:
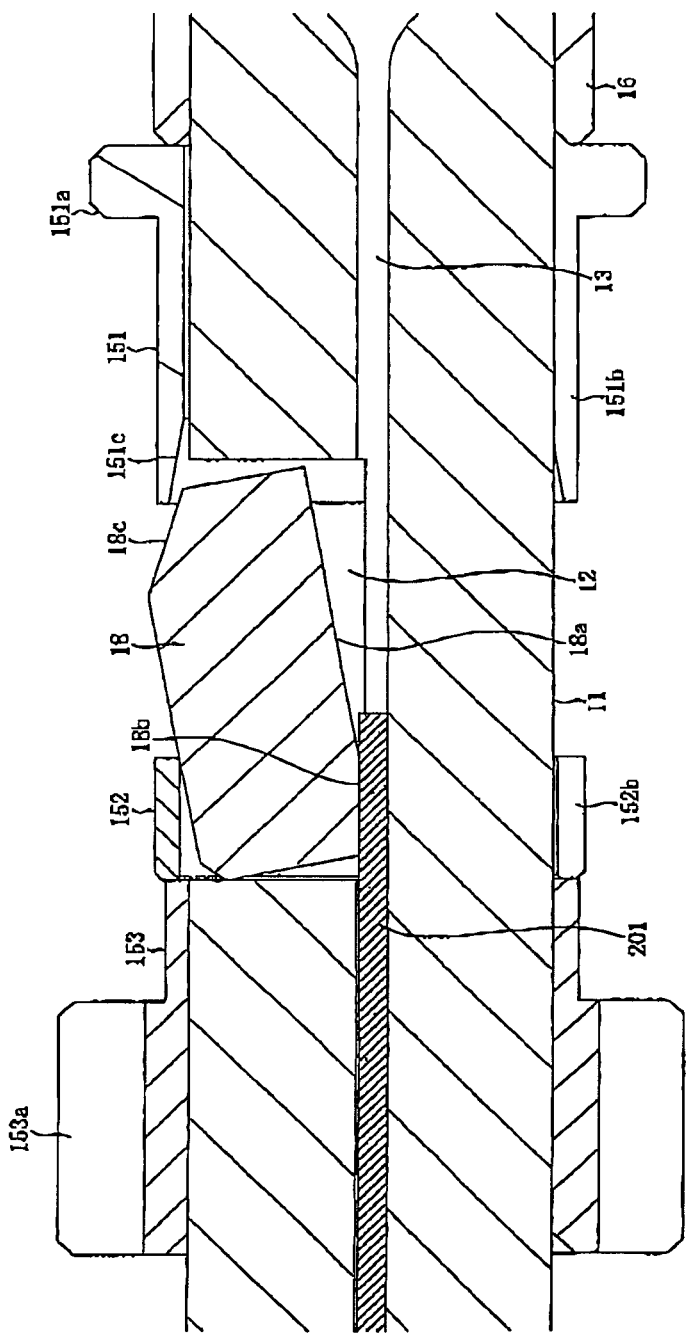
FIG. 12 is a cross-sectional view of the optical ferrule assembly of the optical connector of FIG. 10.

The following describes the structure of connecting second optical fiber 202 to first optical fiber 201, fixed to ferrule body 11 by sleeve member 15. FIGS. 12-3 illustrate cross-sectional views of the optical ferrule assembly. Similar to the embodiment described above, first optical fiber 201 is inserted in advance into the front side portion of optical fiber loading hole 13, and fixed therein by adhesive or the like. Further, the rear end surface of first optical fiber 201 is situated within notch part 12, as shown in FIG. 12. Finally, retainer 18 is placed in notch part 12, and second sleeve member 152 is engaged with a portion of the upper surface of retainer 18 in the vicinity of the rear end thereof.

Before second optical fiber 202 is inserted into optical fiber loading hole 13, first sleeve member 151 is moved toward the rear end of ferrule body 11, with the rear edge abutting against the front edge of core cable fixing member 16 fitted on the rear end of ferrule body 11, as shown in FIG. 12, so that the front end projects in the space above the portion in the vicinity of the rear end of notch part 12. Second sleeve member 152 abuts, at its front edge, the rear edge of third sleeve member 153, and is situated at such a position as to cover the space above the portion in the vicinity of the front end of notch part 12. The structure of notch part 12 and the structure of retainer 18 placed in notch part 12 are identical with those described above.

First sleeve member 151 and second sleeve member 152 are preferably formed of known plastic material with some degree of elasticity, and have slit 151b and slit 152b cut in the cylindrical sidewall and extending in the longitudinal direction, respectively. First and second sleeve members 151, 152 are engaged with the outer periphery of ferrule body 11, with their respective diameters slightly enlarged. That is, first and second sleeve members 151, 152 are fitted on ferrule body 11 in a loose press-fit state. This enables first and second sleeve members 151, 152 to move lengthwise. The force by which second sleeve member 152 fastens ferrule body 11 is preferably smaller than the force by which first sleeve member 151 fastens ferrule body 11. Nevertheless, the forces under which first and second sleeve members 151, 152 fasten ferrule body 11 can be controlled by adjusting the inner diameter, the wall thickness and the like. As the material composing first and second sleeve members 151, 152 is elastic, slits 151b, 152b can be omitted.

Third sleeve member 153 is fitted on ferrule body 11 so that its internal surface makes close contact with the external surface of ferrule body 11. The force by which third sleeve member 153 fastens ferrule body 11 is preferably larger than the force by which first and second sleeve members 151, 152 fasten ferrule body 11, and third sleeve member 153 cannot move lengthwise relative to ferrule body 11. Adhesive may be applied to bond third sleeve member 153 to ferrule body 11. As shown in FIGS. 12-3, the rear edge of third sleeve member 153 is in a position coinciding with the front edge of notch part 12. Since third sleeve member 153 is fixed to ferrule body 11, second sleeve member 152 can be positioned easily and reliably at the position shown in FIG. 12 by bringing the front edge of second sleeve member 152 into contact with the rear edge of third sleeve member 153.

As second sleeve member 152 is adapted to cover space above the portion in the vicinity of the front end of notch part 12, the uppermost part of the outer peripheral surface of retainer 18 contacts the internal surface of second sleeve member 152, and the portion in the vicinity of the front end of retainer 18 is pressed down from above by second sleeve member 152. Since first inclined surface 18b, inclined upward, is formed at the front end of lower surface 18a of retainer 18, the front end of retainer 18 is lowered and the rear end thereof is raised, and retainer 18 is inclined as a whole, as shown in FIG. 12. Consequently, first inclined surface 18b becomes horizontal and is opposed to the upper surface of first optical fiber 201, and lower surface 18a is inclined upward to leave space with respect to the upper surface of notch part 12. Further, in the longitudinal direction, the range of lower surface 18a is larger than the range of first inclined surface 18b, and thus the space occurs over a wide range from the rear end of notch part 12, due to the rise of lower surface 18a. Here, the dimension from the front to the rear of first inclined surface 18b is set so that the rear end surface of first optical fiber 201 is situated below lower surface 18a, as shown in FIG. 12. Although the front end of first sleeve member 151 projects upward in the vicinity of the rear end of notch part 12, retainer 18 can be inclined without interfering with first sleeve member 151, because inclined surface 151c inclined upward is formed on the inner surface at the front end of first sleeve member 151, and second inclined surface 18c of a conical surface form is formed at the rear end of retainer 18.

Second optical fiber 202 is inserted from the rear end side of ferrule body 11 into optical fiber loading hole 13, with retainer 18 in the inclined state, as shown in FIG. 12. The remaining space is due to the rise of lower surface 18a over the wide range from the rear end of notch part 12. Thus, the tip of second optical fiber 202 can be advanced smoothly into notch part 12. Second optical fiber 202 is then advanced, bringing the front end surface into abutment against the rear end surface of first optical fiber 201 within notch part 12.

Figure 13:
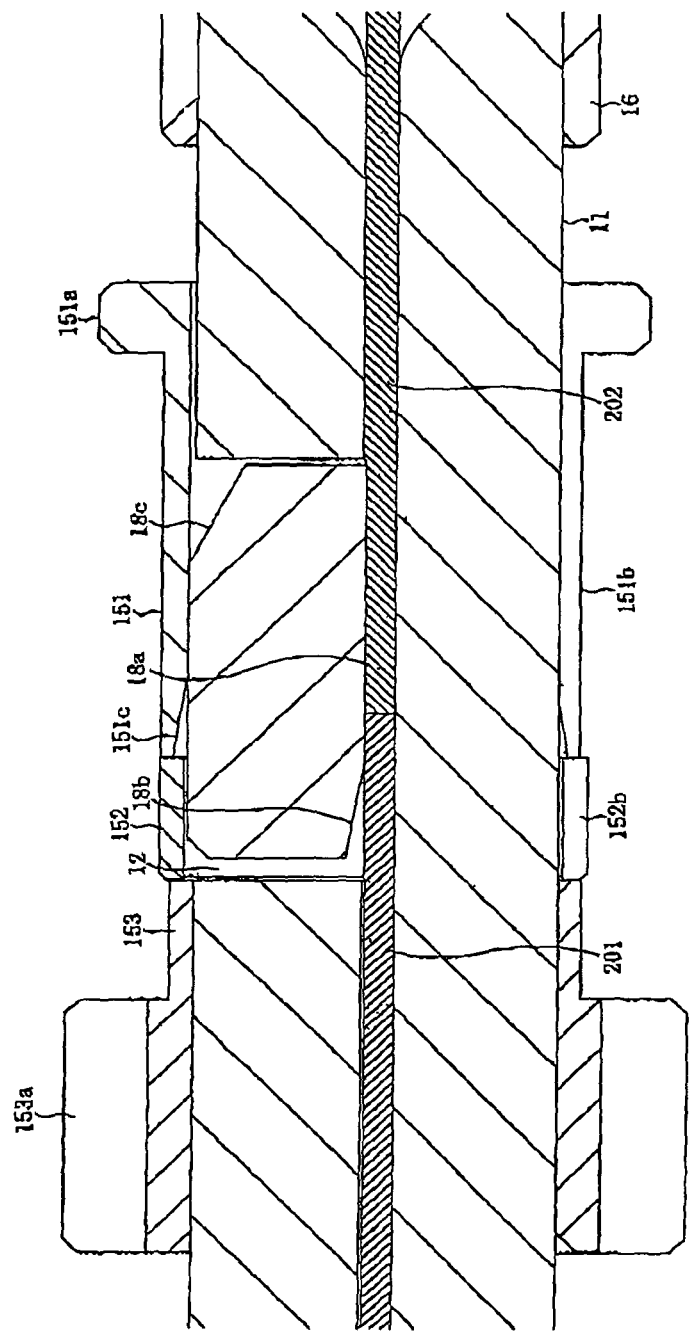
FIG. 13 is a further cross-sectional view of the optical ferrule assembly of the optical connector of FIG. 10.

Subsequently, first sleeve member 151 is slid and shifted forward, so as to bring the front edge of first sleeve member 151 into abutment against the rear edge of second sleeve member 152, as shown in FIG. 13. Since the front edge of second sleeve member 152 is in contact with the rear edge of third sleeve member 153, first sleeve member 151 can be positioned easily and reliably at the position shown in FIG. 13, by bringing the front edge of first sleeve member 151 into abutment against the rear edge of second sleeve member 152.

Thus, first and second sleeve members 151, 152 cover entirely the space above notch part 12, and the whole of the outer peripheral surface of retainer 18 contacts the inner surfaces of the first and second sleeve members 151, 152, and retainer 18 is entirely pressed down from above by the first and second sleeve members 151, 152. Therefore, lower surface 18a is lowered from the state as shown in FIG. 12, and then becomes horizontal and is opposed to the upper surfaces of optical fiber 20.

As described above, the force by which second sleeve member 152 fastens ferrule body 11 is preferably smaller than the force by which first sleeve member 151 fastens ferrule body 11. Therefore, when retainer 18 is inclined by the fastening force of second sleeve member 152, and when first sleeve member 151 is advanced, the rear end of retainer 18 is pressed down under this fastening force, and retainer 18 becomes entirely horizontal. Therefore, the rear end of retainer 18 is lowered under the larger fastening force of first sleeve member 151, and the front end of retainer 18 can be raised against the downward force exerted by second sleeve member 152. In this manner, retainer 18 is urged down under the force by which first and second sleeve members 151, 152 fasten ferrule body 11, and lower surface 18a of retainer 18 presses the upper surfaces of optical fiber 20, to thereby press them against the bottom surface of optical fiber loading hole 13 within notch part 12. Thus, second optical fiber 202 is fixed in optical fiber loading hole 13 in notch part 12.

Thus, in this embodiment, sleeve member 15 includes first sleeve member 151 movable relative to ferrule body 11, and second sleeve member 152 is provided at a position where it covers the space above the portion in the vicinity of the front end of notch part 12. By shifting first sleeve member 151 rearward so as to contact core cable fixing member 16, and by bringing second sleeve member 152 into contact with third sleeve member 153, first and second sleeve members 151, 152 can be positioned at a predetermined position, and retainer 18 can be inclined to enable the tip of second optical fiber 202 to advance smoothly in notch part 12. After inserting second optical fiber 202, by shifting first sleeve member 151 forward to bring it into contact with second sleeve member 152 abutting with third sleeve member 153, the first and second sleeve members 151, 152 can be positioned at other predetermined positions, respectively, and lower surface 18a of retainer 18 presses the upper surface of second optical fiber 202, so that second optical fiber 202 is fixed in optical fiber loading hole 13 in notch part 12.

This facilitates and ensures the positioning of first and second sleeve members 151, 152. Consequently, second optical fiber 202 can be connected to first optical fiber 201 fixed to ferrule body 11 accurately and in a short time, thereby assembling optical connector 30.

Figure 14:
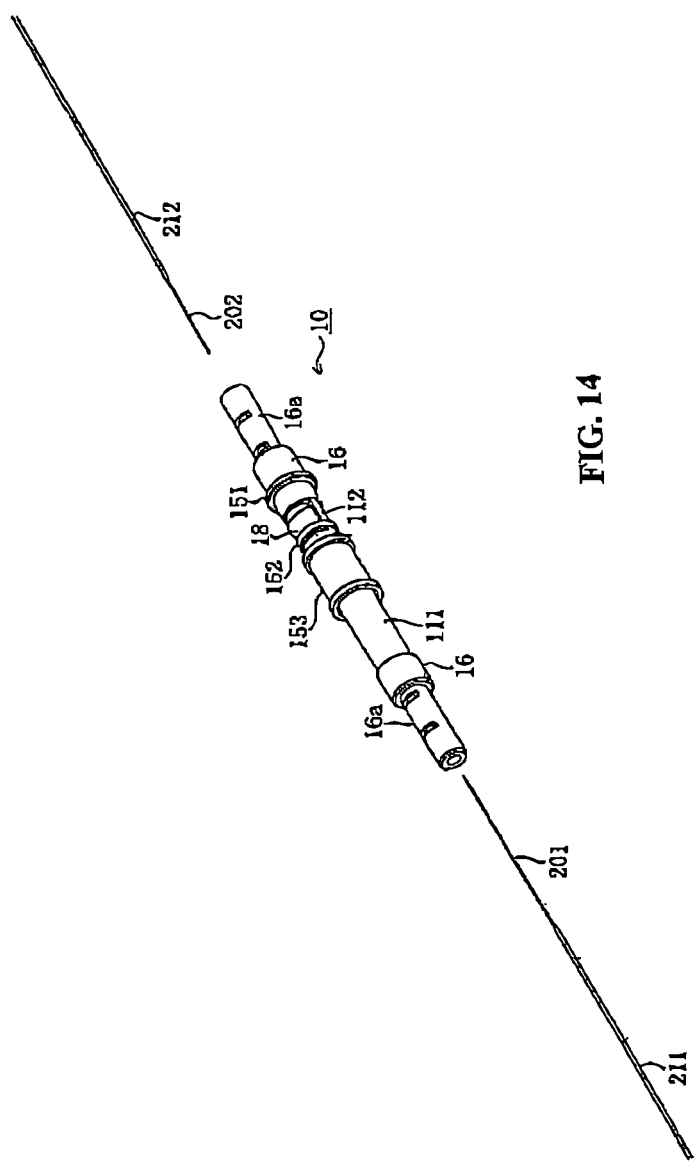
FIG. 14 is a perspective view of an optical ferrule assembly of an optical connector, according to a further embodiment of the Present Invention, showing the state before connecting optical fibers.
Figure 15:
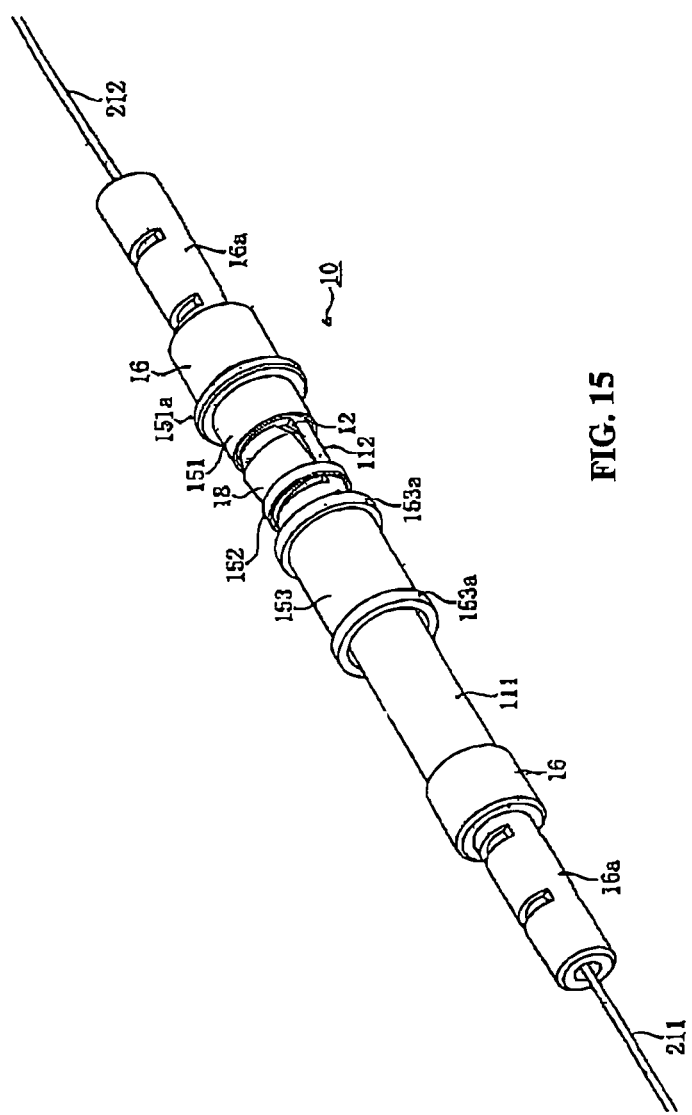
FIG. 15 is a further perspective view of the optical ferrule assembly of the optical connector of FIG. 14, showing the state before connecting the optical fibers.
Figure 16:
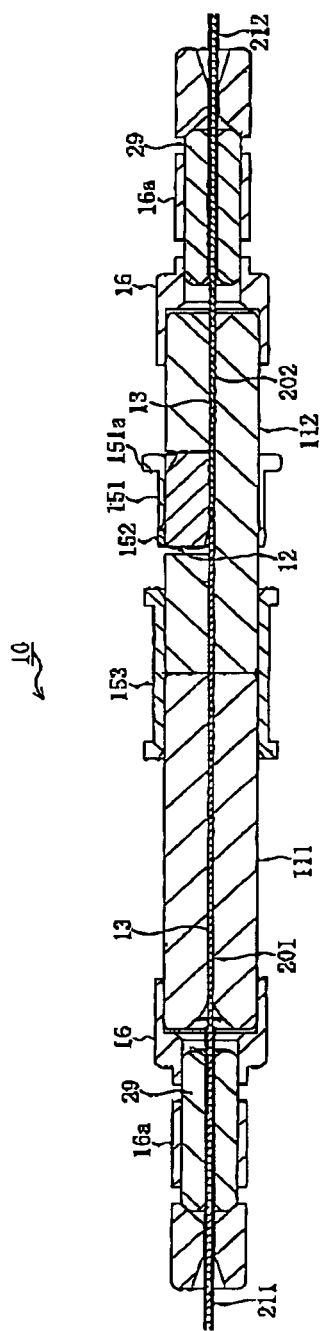
FIG. 16 is a cross-sectional view of the optical ferrule assembly of the optical connector of FIG. 14, showing the state where the optical fibers are connected.
Figure 17:
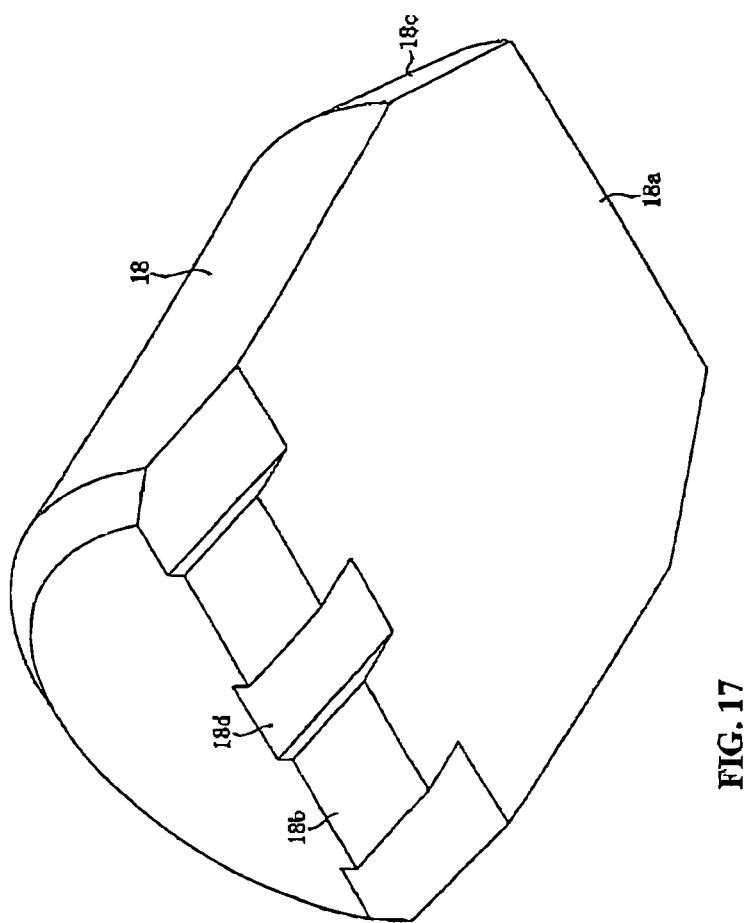
FIG. 17 is a perspective view of the retainer of the optical connector of FIG. 14.
Figure 18:
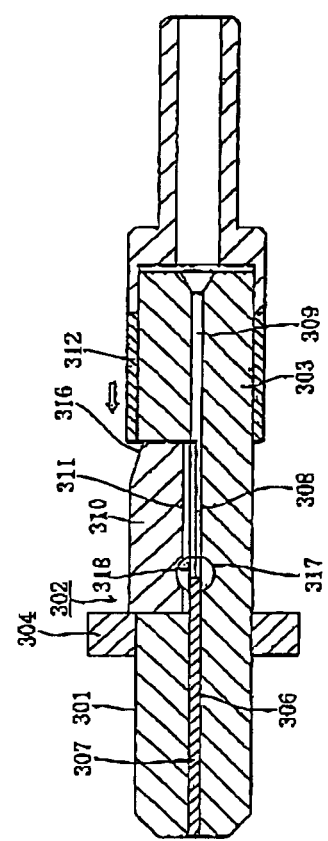
FIG. 18 is a cross-sectional view showing the structure of a conventional optical ferrule assembly.

A further embodiment will be described below. FIGS. 14-5 illustrate perspective views of an optical ferrule assembly in accordance with this embodiment of the Present Invention, shown before connecting the optical fiber. FIG. 16 is a cross-sectional view showing the optical ferrule assembly when connected to the optical fiber. FIG. 17 is a perspective view of the retainer.

Referring to FIGS. 14-7, ferrule body 11 is composed of first ferrule body 111 and second ferrule body 112. Only second ferrule body 112 has notch part 12 into which retainer 18 is placed. Otherwise, first and second ferrule bodies 111, 112 have the same structure. First and second ferrule bodies 111, 112 are connected to each other such that their respective front end surfaces abut, and the axes of optical fiber loading holes 13 of first and second ferrule bodies 111, 112 are coaxial. First and second ferrule bodies 111, 112 are fixed to each other by third sleeve member 153 fitted on the outer peripheries of the first and second ferrule bodies 111, 112 so as to cover the portions in the vicinity of the front ends thereof. Alternatively, first and second ferrule bodies 111, 112 may be of integral structure, in which case third sleeve member 153 can be omitted.

Core cable fixing members 16 are fitted on the rear ends of the first and second ferrule bodies 111, 112, respectively, and elastic sleeve members 29, preferably a thick-walled cylinder having central through-holes through which having axes substantially coinciding with the axes of the optical fiber loading holes 13 are disposed, are held in cylindrical crimping portions 16a of the core cable fixing members 16.

Further, retainer 18 has groove 18d that is formed at least at a mid-portion in the width direction of first inclined surface 18b and extends in the longitudinal direction, as shown in FIG. 17. The bottom surface of groove 18d is substantially parallel to first inclined surface 18b, and groove 18d is formed so as to extend at least over the entire region of first inclined surface 18b in the longitudinal direction. The width of groove 18d is preferably equal to or greater than the inner diameter of optical fiber loading hole 13 in notch part 12. The depth of groove 18d is preferably equal to or greater than the radius of optical fiber 20, each being inserted into optical fiber loading hole 13 in notch part 12. Alternatively, a plurality of grooves 18d may be formed. For example, as shown in FIG. 17, grooves 18d may be also formed at both ends in the width direction of first inclined surface 18b.

As described above, optical connector 30 is adapted to be assembled by inserting and fixing in advance first optical fiber 201 in the front side portion of optical fiber loading hole 13 of ferrule body 11, and then inserting second optical fiber 202 from the rear end side of ferrule body 11 into optical fiber loading hole 13. In this embodiment, optical connector 30 is adapted to be assembled by inserting first and second optical fibers 201, 202 from the rear end sides of the first and second ferrule bodies 111, 112, respectively, into optical fiber loading holes 13, in the same manner.

As shown in FIG. 14, before inserting optical fiber 20 into optical fiber loading holes 13, first sleeve member 151 is moved toward the rear end of second ferrule body 112, and the front end thereof projects in the space above the portion in the vicinity of the rear end of notch part 12. Second sleeve member 152 is arranged at a position where it covers the space above the vicinity of the front end of notch part 12.

Then, first optical fiber 201 is inserted from the rear end side of first ferrule body 111 into optical fiber loading hole 13, and second optical fiber 202 from the rear end side of second ferrule body 112 into optical fiber loading hole 13, with retainer 18 in the inclined state, as shown in FIG. 14. First optical fiber 201 is obtained by removing the protective coating layer in a predetermined length range from the tip of first optical fiber core cable 211. Preferably, first optical fiber 201 is longer than second optical fiber 202. First and second optical fibers 201, 202 then meet inside of notch part 12, respectively, and are further inserted into optical fiber loading hole 13 until they abut against each other within notch part 12.

Since second sleeve member 152 is adapted to cover the space above the portion in the vicinity of the front end of notch part 12, the uppermost part of the outer peripheral surface of retainer 18 contacts the inner surface of second sleeve member 152, and the portion in the vicinity of the front end of retainer 18 is pressed down from above by second sleeve member 152. Since first inclined surface 18b is formed at the front end of lower surface 18a of retainer 18, the front end of retainer 18 is then lowered and the rear end thereof is raised, and retainer 18 is entirely inclined. Thus, first inclined surface 18b becomes horizontal and is opposed to the upper surface of first optical fiber 201, and lower surface 18a is inclined upward and space is left between retainer 18 and the upper surface of notch part 12. This enables the tip of second optical fiber 202 to smoothly advance into notch part 12.

Additionally, since groove 18d is formed centrally of the width direction of first inclined surface 18b, and groove 18d is opposed to optical fiber loading hole 13 in notch part 12, the tip of first optical fiber 201 inserted from the rear end side of first ferrule body 111 can smoothly be advanced into notch part 12 through the space formed between optical fiber loading hole 13 and groove 18d. This enables the front end surfaces of first and second optical fiber 201, 202 to abut against each other within notch part 12.

Subsequently, first sleeve member 151 is slid and shifted forward so as to bring the front edge into abutment against the rear edge of second sleeve member 152, as shown in FIG. 16. Therefore, first and sleeve members 151, 152 cover entirely the space above notch part 12, and the whole of the outer peripheral surface of retainer 18 contacts the inner surfaces of first and second sleeve members 151, 152, and retainer 18 is entirely pressed down from above by the first and second sleeve members 151, 152. Therefore, as shown in FIG. 16, lower surface 18a becomes horizontal and opposed to the upper surfaces of optical fiber 20. Thus, retainer 18 is urged down under the force by which first and second sleeve members 151, 152 fasten ferrule body 11, and lower surface 18a of retainer 18 presses the upper surfaces of optical fiber 202, thereby pressing them against the bottom surface of optical fiber loading hole 13 within notch part 12. Thus, second optical fiber 202 is fixed in optical fiber loading hole 13 in notch part 12.

Subsequently, with a tool such as radio pliers, the operator pinches the sidewalls of crimping portions 16a of core cable fixing members 16 in order to subject the sidewalls to inward plastic deformation. As the result, first and optical fiber core cables 211, 212 each pass through the inside of crimping portion 16a and are pinched and fixed by the sidewalls. Thus, first optical fiber 201 of first optical fiber core cable 211 and second optical fiber 202 of second optical fiber core cable 212 can be connected by optical ferrule assembly 10.

In this embodiment, since groove 18d is formed in first inclined surface 18b of retainer 18, and groove 18d corresponds to optical fiber loading hole 13 in notch part 12, the tip of first optical fiber 201 can be advanced smoothly into notch part 12. This enables optical ferrule assembly 10 to connect first optical fiber 201 of first optical fiber core cable 211 and second optical fiber 202 of second optical fiber core cable 212. Additionally, the presence of groove 18d of retainer 18 enables the first and second optical fibers 201 and 202 to be connected to each other, without using optical connector 30 and connecting adaptor 35. Furthermore, the optical fibers can be connected to each other without requiring any previous bonding and fixing of first optical fiber 201 described herein.

The Present Invention is not limited to the above-described embodiments, and may be changed in various ways based on the gist of the Present Invention, and these changes are not eliminated from the scope of the Present Invention.

What is claimed is:

1. An optical ferrule assembly, the optical ferrule assembly comprising:
 a ferrule body, the ferrule body including an optical fiber loading hole extending therethough in a longitudinal direction;
 a notch part formed in the ferrule body, the notch part including a flat surface including the optical fiber loading hole;
 a retainer arranged in the notch part, the retainer including a lower abutting surface opposing to the flat surface, an inclined abutting surface formed on one end side of the lower abutting surface, an outer peripheral surface opposite the lower abutting surface, and a conical surface formed at the rear end of the retainer proximate the outer peripheral surface, the outer peripheral surface having a semi-cylindrical shape; and
 an annular member fit on an outer periphery of the ferrule body;

wherein:
 the inclined abutting surface is opposed to the flat surface, and the lower abutting surface is inclined to the flat surface and separated from the flat surface, when the annular member is brought into contact with a portion of the outer peripheral surface; and
 the inclined abutting surface is inclined to the flat surface and separated from the flat surface, and the lower abutting surface is opposed to the flat surface, when the annular member is brought into contact with the whole of the outer peripheral surface.

2. The optical ferrule assembly according to claim 1, wherein the optical fiber loading hole accommodates a first optical fiber inserted in advance from one end side of the ferrule body.

3. The optical ferrule assembly according to claim 1, wherein the annular member includes a first annular member and a second annular member.

4. The optical ferrule assembly according to claim 1, wherein the retainer includes a groove formed in the inclined abutting surface.

5. The optical ferrule assembly according to claim 2, wherein the first optical fiber extends from one end side of the retainer into the notch part.

6. The optical ferrule assembly according to claim 5, wherein the end surface of the first optical fiber is positioned at a position of the optical fiber loading hole corresponding to the lower abutting surface.

7. The optical ferrule assembly according to claim 6, wherein a second optical fiber inserted from the other end side of the ferrule body is inserted from the other end side of the retainer into the notch part, and the end surface of the second optical fiber is brought into abutment against the end surface of the first optical fiber, when the annular member is brought into contact with the portion of the outer peripheral surface of the retainer on one end side thereof.

8. The optical ferrule assembly according to claim 7, wherein the second optical fiber is pressed and fixed by the lower abutting surface, when the annular member is brought into contact with the whole of the outer peripheral surface of the retainer.

9. The optical ferrule assembly according to claim 3, wherein the inclined abutting surface is opposed to the flat surface, and the lower abutting surface is inclined to the flat surface and separated from the flat surface, when the first annular member is not brought into contact with the outer peripheral surface of the retainer and the second annular member is brought into contact with the outer peripheral surface of the retainer of one end side thereof.

10. The optical ferrule assembly according to claim 9, wherein the inclined abutting surface is inclined to the flat surface and separated from the flat surface, and the lower abutting surface is opposed to the flat surface, when the first annular member is brought into contact with the outer peripheral surface of the retainer.

11. The optical ferrule assembly according to claim 4, wherein the groove is opposed to the optical fiber loading hole, when the inclined abutting surface is opposed to the flat surface.

12. The optical ferrule assembly according to claim 10, wherein the fastening force of the first annular member is set larger than the fastening force of the second annular member.

* * * * *